US006812857B1

(12) United States Patent
Kassab et al.

(10) Patent No.: US 6,812,857 B1
(45) Date of Patent: Nov. 2, 2004

(54) PARKING METER CONTROL DISPATCH AND INFORMATION SYSTEM AND METHOD

(76) Inventors: Shaffiq Kassab, 3494 Red Rose Dr., Encino, CA (US) 91436; Mark Hunt, 2568 Albatross St., San Diego, CA (US) 92101-1452; Robert Hunt, 2568 Albatross St., San Diego, CA (US) 92101-1452

( * ) Notice: Subject to any disclaimer, the term of this patent is extended or adjusted under 35 U.S.C. 154(b) by 0 days.

(21) Appl. No.: 10/130,336

(22) PCT Filed: Nov. 10, 2000

(86) PCT No.: PCT/US00/42128

§ 371 (c)(1), (2), (4) Date: Oct. 17, 2002

(87) PCT Pub. No.: WO01/35264

PCT Pub. Date: May 17, 2001

Related U.S. Application Data

(60) Provisional application No. 60/165,081, filed on Nov. 12, 1999.

(51) Int. Cl.[7] .................................................. B60Q 1/48

(52) U.S. Cl. ................................ 340/932.2; 340/539.11

(58) Field of Search .............................. 340/932.2, 933, 340/309.16, 539.11, 539.16, 539.17; 194/200, 337, 217; 705/13, 14, 418; 368/90; 320/2

(56) References Cited

U.S. PATENT DOCUMENTS

| | | | | | |
|---|---|---|---|---|---|
| 5,382,780 | A | | 1/1995 | Carmen | |
| 5,499,181 | A | * | 3/1996 | Smith | 340/457.4 |
| 5,563,491 | A | * | 10/1996 | Tseng | 320/109 |
| 5,740,050 | A | * | 4/1998 | Ward, II | 705/418 |
| 5,777,951 | A | | 7/1998 | Mitschele et al. | |
| 5,852,411 | A | | 12/1998 | Jacobs et al. | |
| 5,940,481 | A | | 8/1999 | Zeitman | |
| 6,037,880 | A | * | 3/2000 | Manion | 340/932.2 |
| 6,078,272 | A | | 6/2000 | Jacobs et al. | |
| 6,102,285 | A | | 8/2000 | Elias | |
| 6,195,015 | B1 | | 2/2001 | Jacobs et al. | |
| 6,240,365 | B1 | | 5/2001 | Bunn | |
| 6,249,233 | B1 | | 6/2001 | Rosenberg et al. | |
| 6,266,609 | B1 | | 7/2001 | Fastenrath | |
| 6,380,851 | B1 | * | 4/2002 | Gilbert et al. | 340/517 |
| 6,490,443 | B1 | * | 12/2002 | Freeny, Jr. | 455/406 |
| 6,559,776 | B2 | | 5/2003 | Katz | |
| 2002/0024451 | A1 | | 2/2002 | Rosenberg | |
| 2002/0030606 | A1 | | 3/2002 | Chauvin | |
| 2003/0132840 | A1 | | 7/2003 | Bahar | |
| 2003/0179107 | A1 | | 9/2003 | Kibria et al. | |

FOREIGN PATENT DOCUMENTS

| | | |
|---|---|---|
| WO | WO02/063570 A2 | 8/2002 |
| WO | WO02/066288 A1 | 8/2002 |

* cited by examiner

*Primary Examiner*—Van T. Trieu
(74) *Attorney, Agent, or Firm*—Foley & Lardner LLP

(57) ABSTRACT

An electronic parking meter system is used with parking enforcement personnel and a plurality of parking meters. The system may include parking meter units associated with a respective parking meter, a data unit for gathering data from the parking meter units, a first communication link for transmitting data between the parking meter units and the data unit, at least one parking enforcement unit associated with the parking enforcement personnel, and a second communication link for transmitting data between the data unit and the parking enforcement unit. The first communication link may be a unidirectional link, allowing the meter units to include a transmitter and be free of a receiver circuit or receiving functionality. In this manner, the meter units may be made relatively inexpensive, thus significantly reducing the overall cost of the system when connected with many meters.

30 Claims, 11 Drawing Sheets

SYSTEM OVERVIEW

SYSTEM OVERVIEW

PARKING METER INTERFACE BLOCK DIAGRAM

MESSAGE FILTERING AND CONCENTRATOR BLOCK DIAGRAM

MASTER DATA COLLECTION SYSTEM BLOCK DIAGRAM

ENFORCEMENT SYSTEM BLOCK DIAGRAM

Figure 1A:
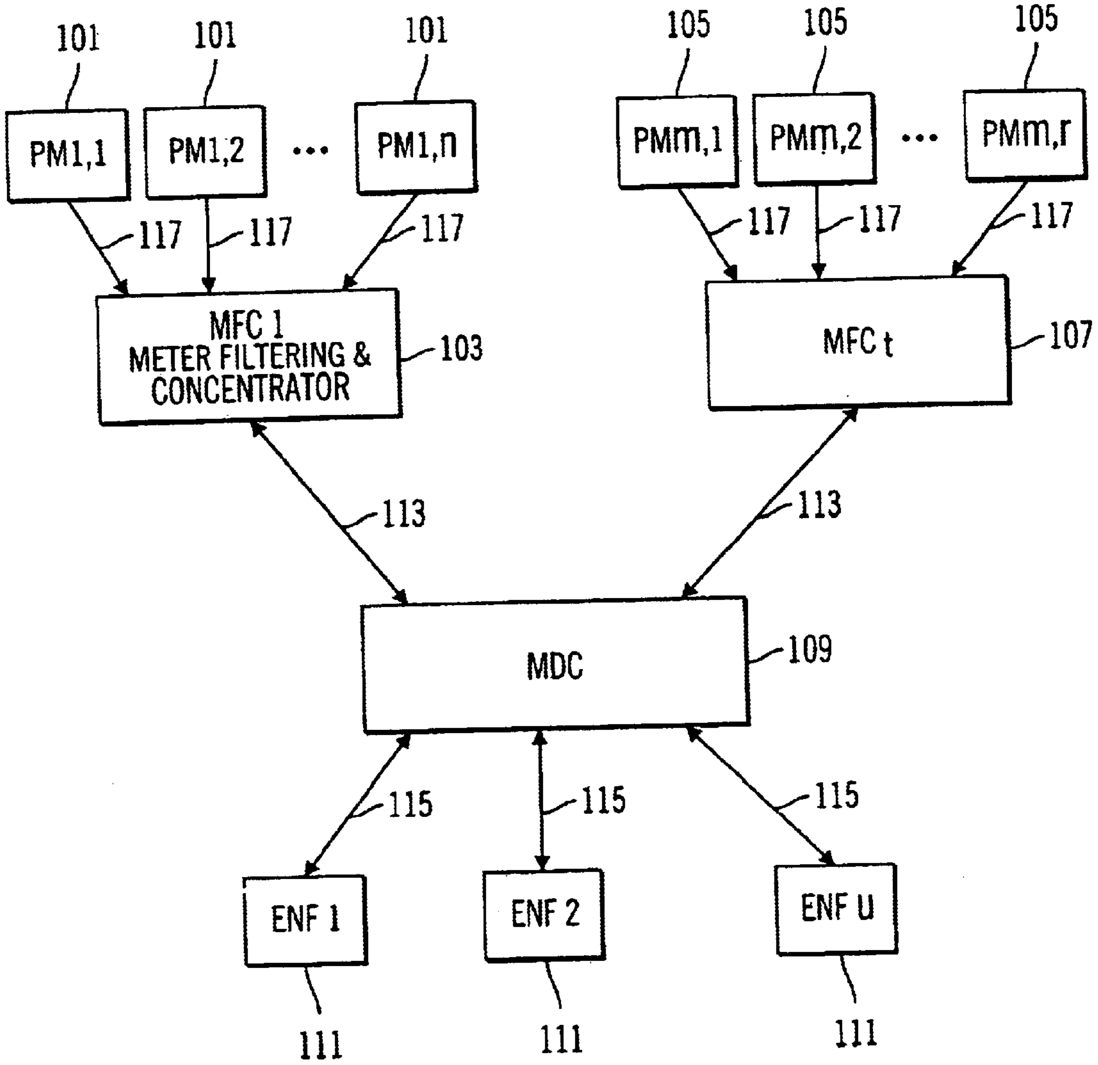

COBWEB ITERATION OF: X(t+1) = 4 (1-X(t)) X(t) FOR TWO SEPARATE STARTING POINTS.

ILLUSTRATION OF A PERIODIC BEHAVIOR AND DIVERGENCE

PARKING METER CONTROL DISPATCH AND INFORMATION SYSTEM AND METHOD

CROSS REFERENCE

The presence application is the national stage under 35 U.S.C. 371 of PCT/US00/42128, filed Nov. 10, 2000, which claims the benefit of U.S. Provisional Patent Application Ser. No. 60/165,081, filed Nov. 12, 1999.

BACKGROUND

1. Field of the Invention

This invention relates generally to the field of parking control and enforcement, and more specifically in particular embodiments to parking meters, enforcement, agents, dispatching systems, and the communications mechanism that link them.

2. Description of the Related Art

Parking meters have long been used to generate revenue and control the sharing of a limited resource. Devices to detect coins have use infrared radiation, the Hall effect sensors, light sensors, and magnetic fields. Some of these methods are described in U.S. Pat. No. 4,460,080 (Howard); U.S. Pat. No. 4,483,431 (Pratt); U.S. Pat. No. 4,249,648 (Meyer); U.S. Pat. No. 5,097,934 (Quinlan); U.S. Pat. No. 5,119,916 (Carmen et al). As time has passed, systems have been developed which include the use of microprocessors, ultrasonic transceivers and IR transceivers for the purposes of detecting the presence of a vehicles and communicating information to outside devices. The power requirements of these systems has led to the use of solar cells to recharge batteries. Solar power cells however, have the drawback of not being useful in areas of limited sunlight or in other conditions which block or retard sunlight, such as snow and rain. As parking meters have become more complex, the need to send and receive information to parking enforcement personnel has increased. The limited range and ease of blocking IR transceivers has led to the use of RF transceivers to transfer data as disclosed in U.S. Pat. No. 4,356,903 (Lemelson et al.); U.S. Pat. No. 5,103,957 (Ng et al.); U.S. Pat. No. 5,153,586 (Fuller); U.S. Pat. No. 5,266,947 (Fujiwara et al.); U.S. Pat. No. 5,777,951 (Mitschele et al.).

Parking meters in general generate revenue in two different ways. The first way that parking meters generate revenue is through the collection of coins at the parking meter device itself. The second method of generating revenues is by means of ticketing vehicles and collecting the corresponding fines for the tickets. In general, the process of ticketing involves much inefficiency. The traditional method of ticketing vehicles is to have an enforcement person drive through the area containing the meters and then visually observe the meters and whether a vehicle is parked in the metered space. There is no easy way for a traditional meter enforcement person to know which area contains the most violations in order to efficiently ticket the vehicles. In addition, some parking areas require that a vehicle vacate the parking space at the end of a predetermined period. The enforcement of such regulation involves the marking of the vehicle, such as by placing a chalk mark on the tires of the vehicle. An enforcement person then returns to the vehicle within a predetermined period to observe if the vehicle has not moved by observing the orientation of the mark on the tires. In addition, parking regulations may change with the time of day. For example, an area which allows a vehicle to park on Saturday and Sunday may not allow a vehicle to park between the hours of 7:00 to 9:00 a.m. and 3:00 to 6:00 p.m., to clear the area for rush hour traffic. Currently, the only way to enforce such restrictions is to have a meter enforcement person drive past the area and visually observe the vehicles parked during the forbidden times. There is currently no easy way for a parking enforcement person to know a priori that there are vehicles illegally parked in one area without actually going to that area. There is also no way to know how many vehicles are illegally parked in an area. The result is that the enforcement of parking regulations and meter regulations has proven to be a hit and miss, random affair. Because parking enforcement vehicles can not be routed directly to areas containing violators and must depend on chance and visual observation, the enforcement of parking regulations is not as efficient as it might be otherwise. In order to enforce parking regulations, more vehicles are needed than would otherwise be needed if the areas where violations were transpiring were known.

SUMMARY OF THE DISCLOSURE

To overcome limitations in the prior art described above, and to overcome other limitations that will become apparent upon reading and understanding the present specification discloses an electronic parking meter system. The parking meter portion of the system comprises electronic circuitry within a parking meter housing which may replace or supplement the traditional housing and contains sensors that provide information about the state of the meter that is whether it is registering a violation, time expired, or is currently metering time. In addition the parking meter electronic circuitry may register information such as the state of the power supply that powers the circuitry, the presence or absence of a vehicle in a space being metered, and whether or not the meter has been tampered with. The electronic circuitry contains controller circuitry, typically a low power microprocessor that periodically awakens and checks the state of all of the sensors. If any one of the sensors has changed state since the last time the microprocessor awoke (i.e. performed non standby processing functions), the microprocessor can power a radio transmitter and transmit the new state of the system. The transmission of state information typically comprises the transmission of a number of parking meter data packets containing state information. The packets are transmitted to a concentrator unit over a predetermined maximum time period using an appropriate transmission schedule such as one generated from a suitable chaotic map. If there is no state change when the microprocessor system awakes it simply goes back to sleep. The radio within the parking meter need not contain a receiver, only a transmitter. The system broadcasts data packets only when state changes occur in order to help comply with FCC part 15 requirements.

The filtering and collecting of the data packets from meters can be achieved typically by a concentrator system housed within a weather proof box mounted high up on a utility pole or other suitable object. The concentrator system is typically placed within radio range of all of the parking meters whose transmissions it is to receive. The concentrator system typically contains two microprocessors that are linked directly together. The first microprocessor is coupled to a radio receiver that listens for data packets from the parking meter radios, filters out duplicate packets and send a single packet, representing a state change in a meter system, on to the second microprocessor. The second microprocessor stores the packets from the first microprocessor in memory while waiting for a data request from a data collection system, or an appropriate time to transmit the information to the data collection system. The second microprocessor typically is connected to a spread spectrum radio transceiver (with greater range than the parking meter radios) and is in constant communication with the data collection system. The spread spectrum radio can be located within the same box as the concentrator system.

The data collection system typically comprises a computer system that is linked to a spread spectrum radio receiver, for communicating with a plurality of concentrator units. Typically a spread spectrum link provides the data link to the various filtering and collecting concentrators and to various enforcement vehicle systems, such as meter maids, towing services, repair services and the like. The data collection system software typically stores the data collected from the parking meters, issues dispatch messages to the enforcement systems, and responds to messages from the enforcement systems that indicate what action was taken with respect to the dispatch messages. Using the information collected from the concentrators, the current state of any parking meter can be conveniently examined.

The software within the data collection system also typically provides a mechanism that allows the operator of the system to associate a calendar with each parking meter. For example the data collection system, by referring to the calendar, is able to check if streets are clear of parked vehicles for a variety of events such as: parades, street sweeping, street maintenance, etc. and is able to dispatch remedial measures.

A further aspect of the present invention is an enforcement system. The enforcement system can be portable and is typically intended to reside aboard an enforcement vehicle. It is typically connected to a spread spectrum radio that provides it with a constant communication link to the master data collection system. Software located in the enforcement system empowers the enforcement officer to select a violation site, notify the master data collection system of enforcement activity, indicate to the master data collection system what action was taken at the site, or to query the master data collection about violations at a particular site.

Other embodiments of a system in accordance with the principles of the invention may include additional aspects and alternate implementations. One such aspect of the present invention is that the parking meters may communicate their change of status using an easily implemented protocol without the complex scheduling and protocol which may be present in many Time Division Multiple Access (TDMA) and Time Sharing schemes.

Additionally the present invention provides a method of collection of useful data on the pattern of parking violations that would otherwise be difficult or costly to obtain. Such data may be used to cost effectively schedule enforcement, and thereby increase efficiency and revenue generation.

These and other advantages and novel features, which characterize the invention, are pointed out in the following specification. For additional understanding and clarification of the invention, its advantages and variations reference should be made to the accompanying drawings and descriptive matter, which illustrate and describe specific examples of embodiments of the invention.

BRIEF DESCRIPTIONS OF THE DRAWINGS

Referring to the accompanying drawings in which like reference numbers represent corresponding parts in all the drawings.

FIG. 1*a* is a block diagram illustrating a system overview according to an embodiment of the invention.

Figure 1B:
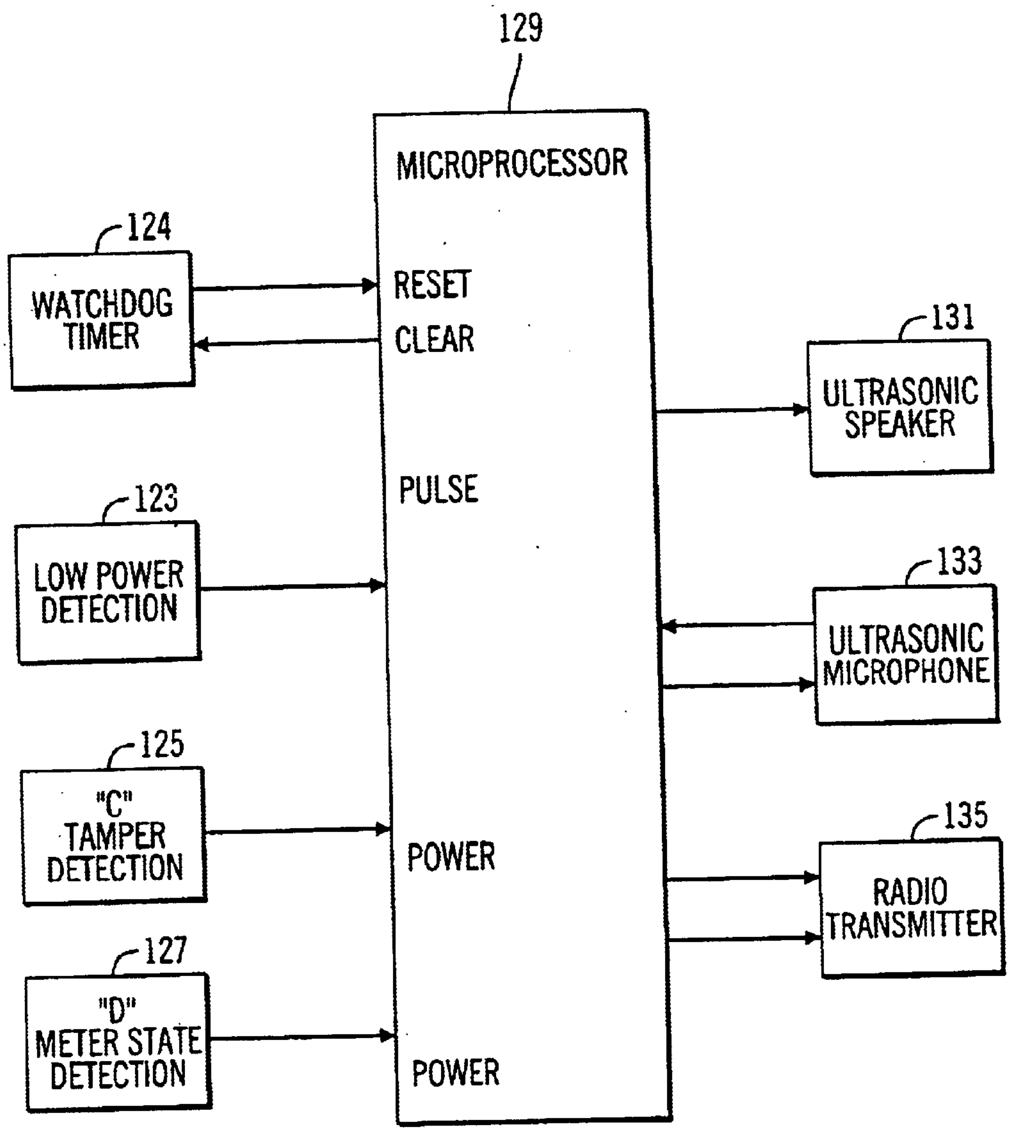

FIG. 1*b* is the block diagram of a parking meter interface according to an embodiment of the invention.

Figure 1C:
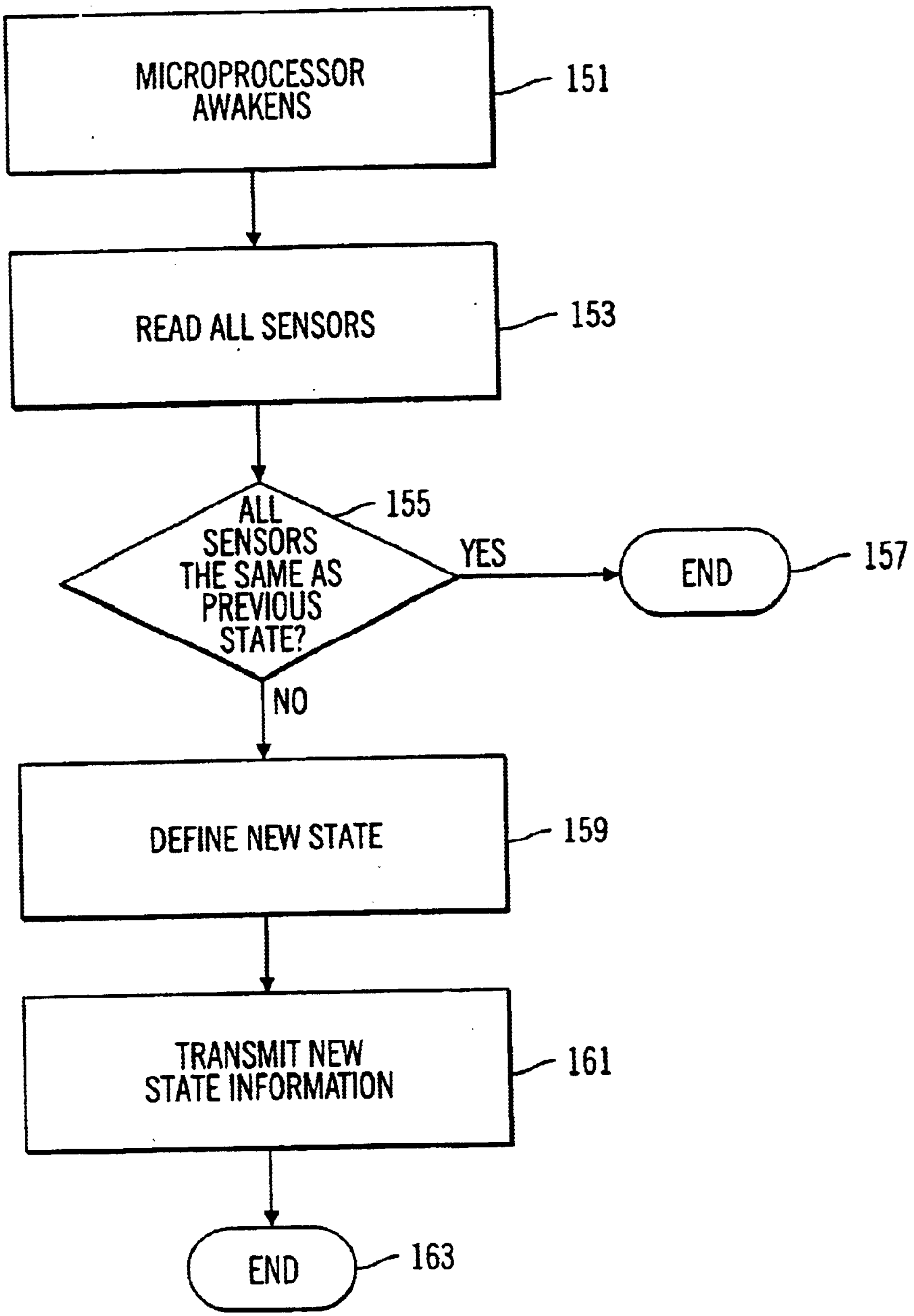

FIG. 1*c* is a flow chart of overall parking meter interface operation according to an embodiment of the invention.

Figure 1D:
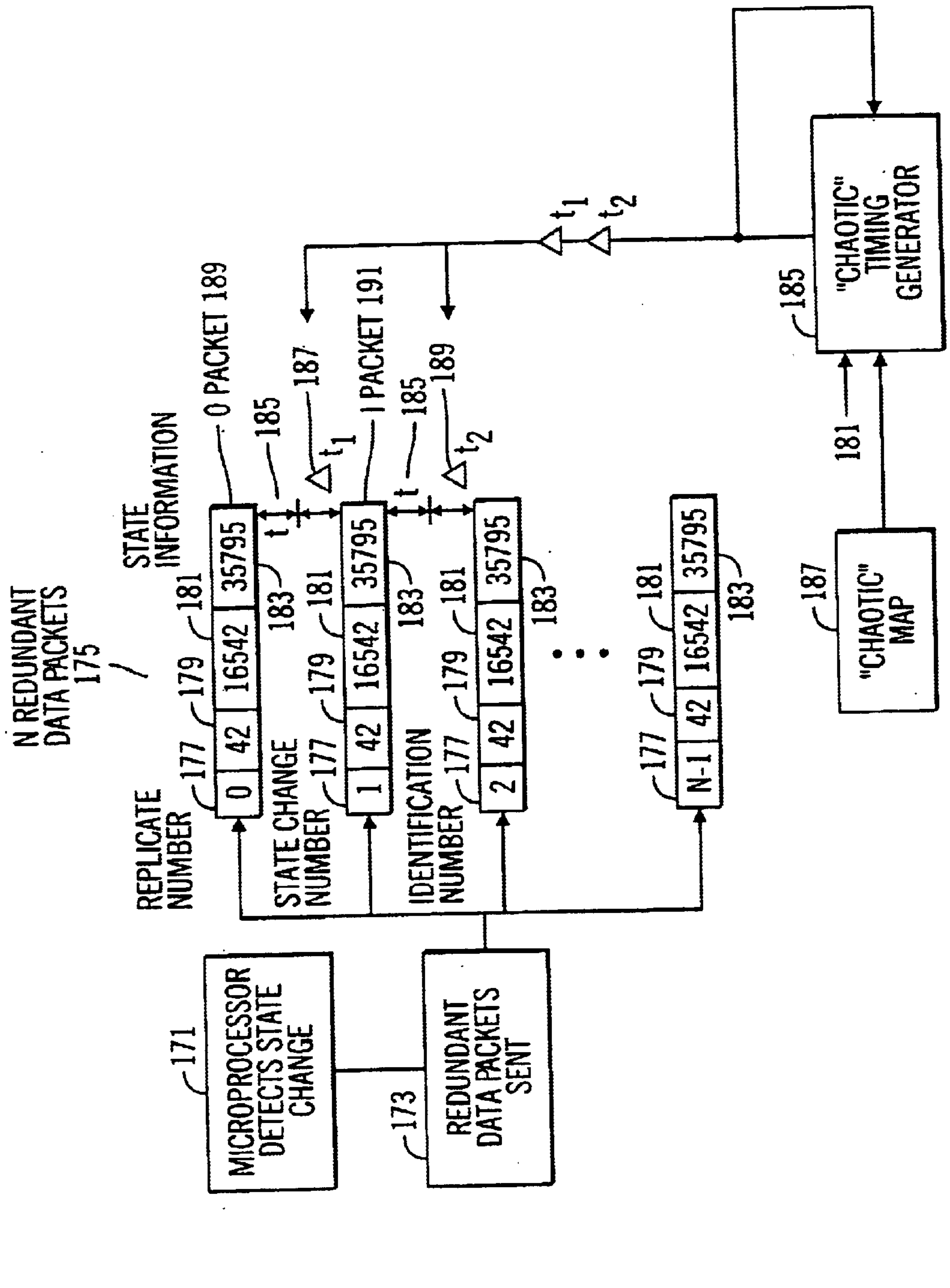

FIG. 1*d* is a graphical illustration of the creation and transmission of data packets by parking meters according to an embodiment of the invention.

Figure 2A:
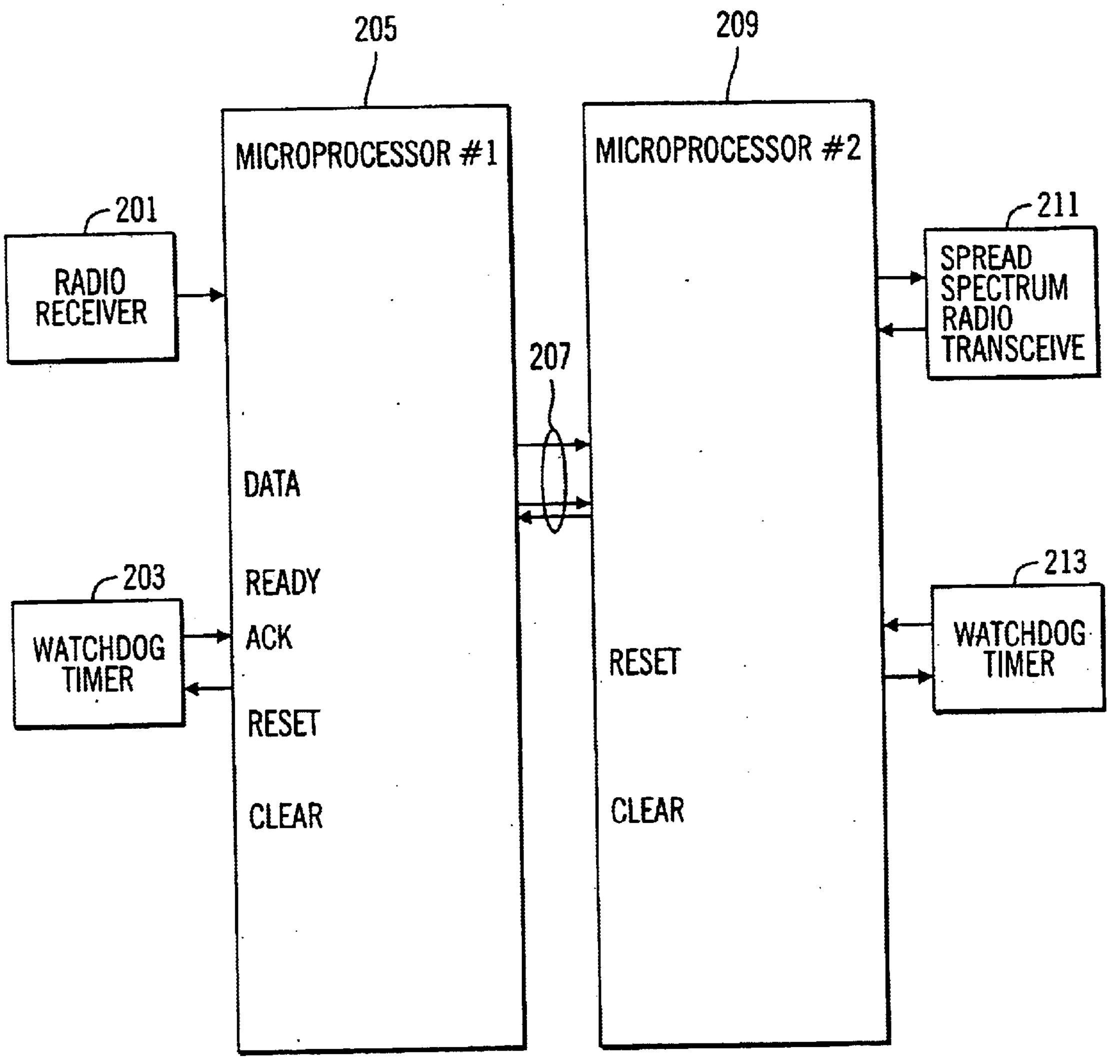

FIG. 2*a* is block diagram of a message filtering and concentrator unit according to an embodiment of the invention.

Figure 2B:
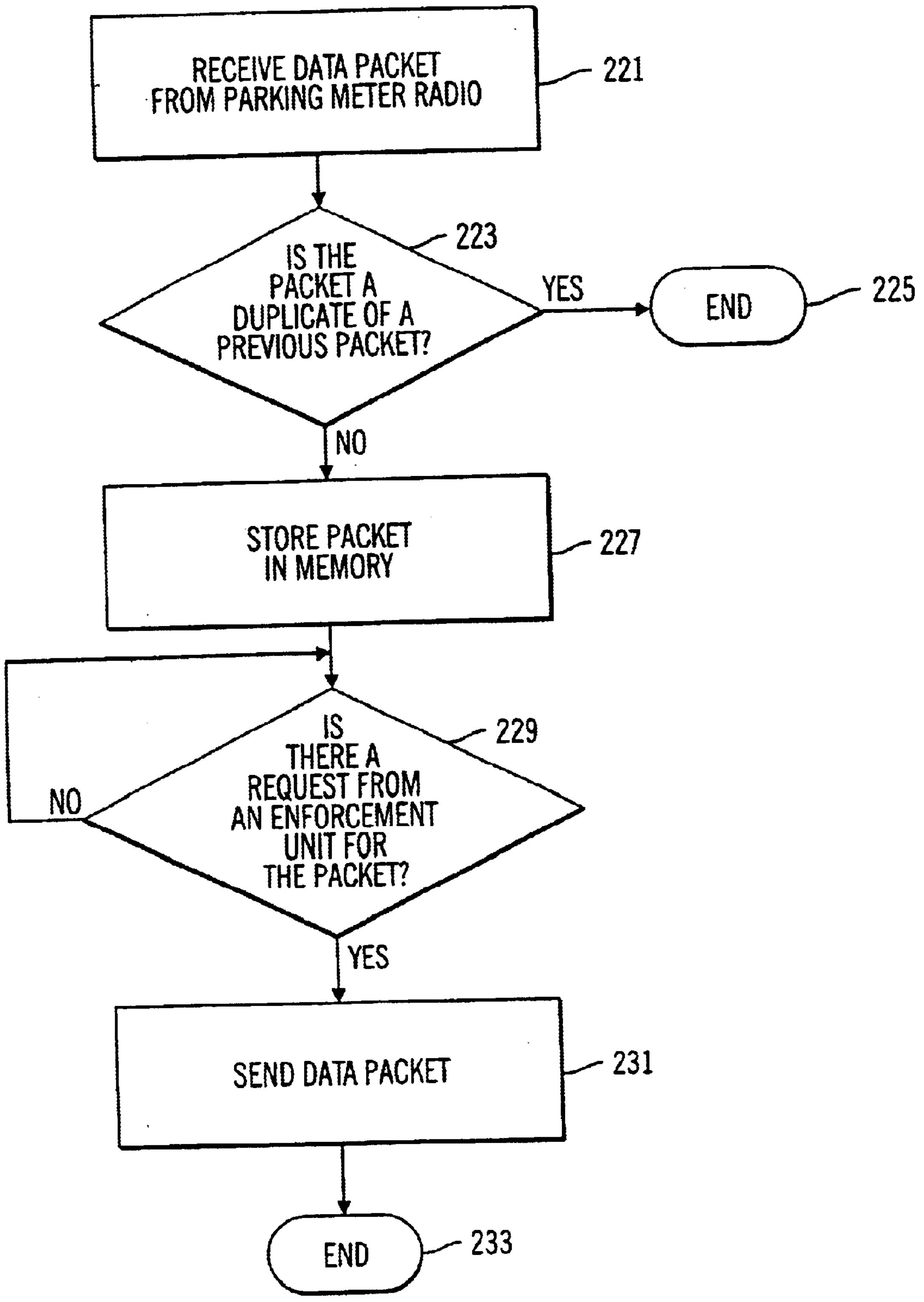

FIG. 2*b* is a flow chart of the process of message filtering and concentration according to an embodiment of the invention.

Figure 3A:
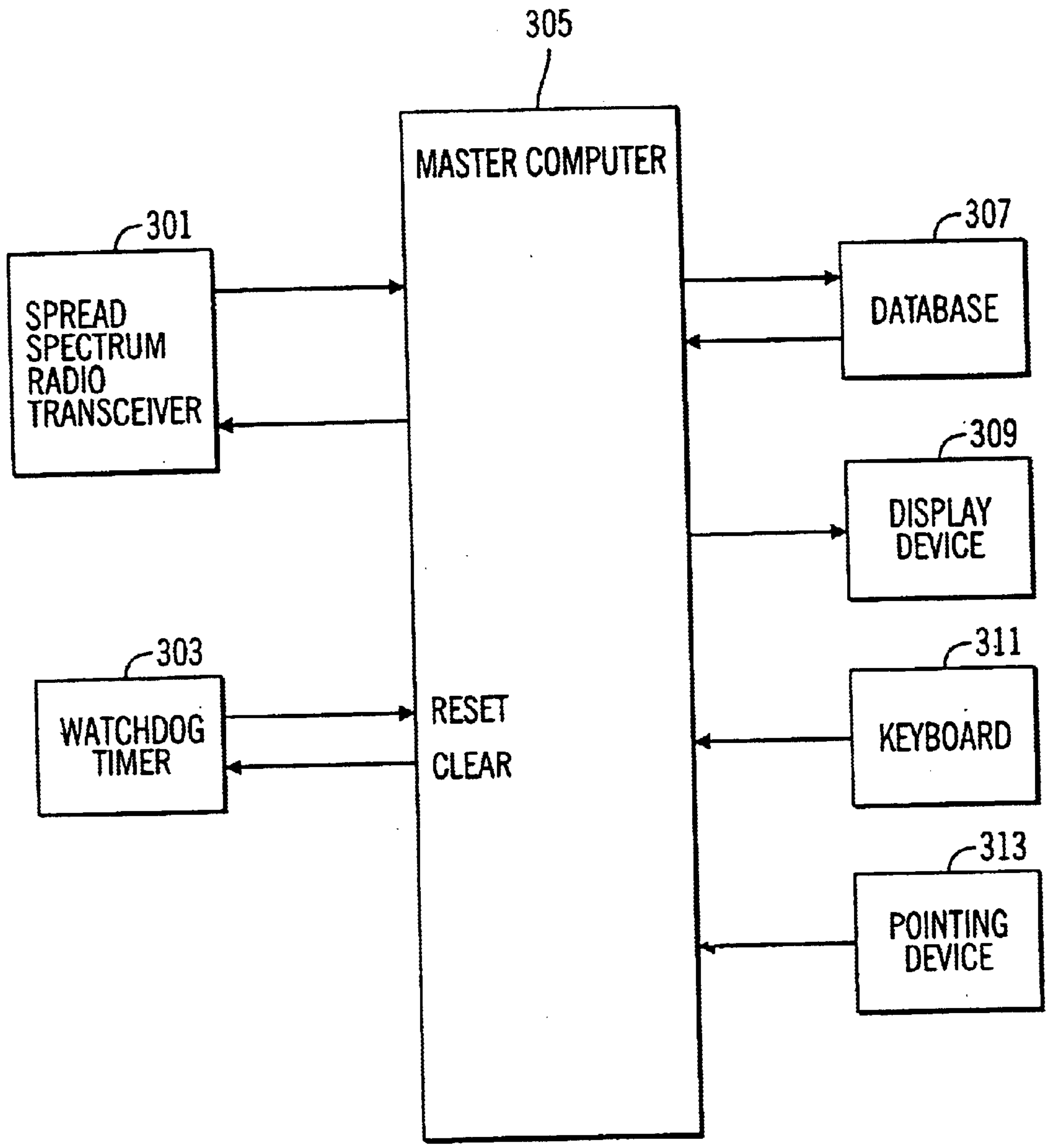

FIG. 3*a* is a block diagram a master data collection system according to an embodiment of the invention.

Figure 3B:
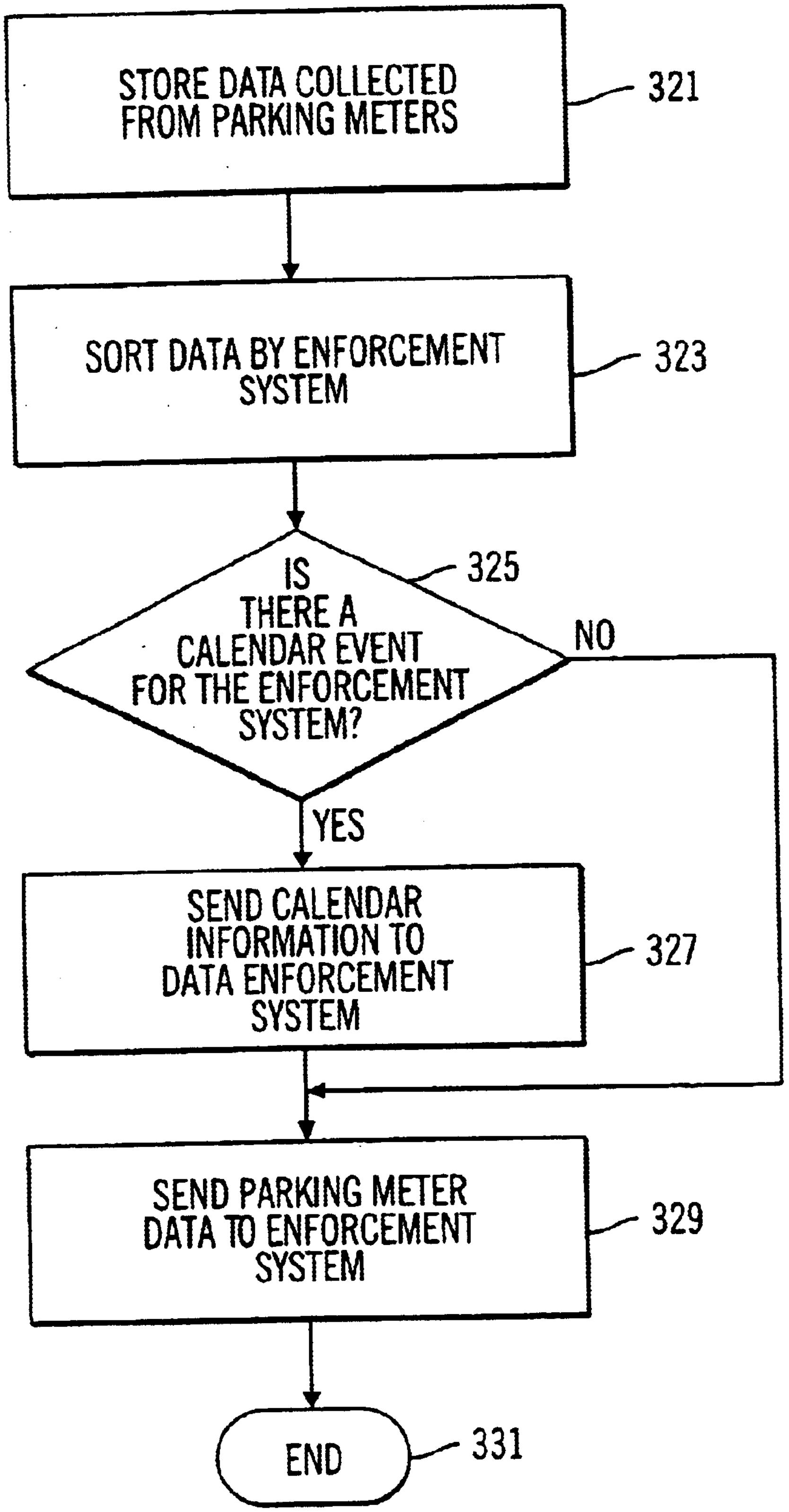

FIG. 3*b* is a flow diagram of the functioning of the master data collection system according to an embodiment of the invention.

Figure 4A:
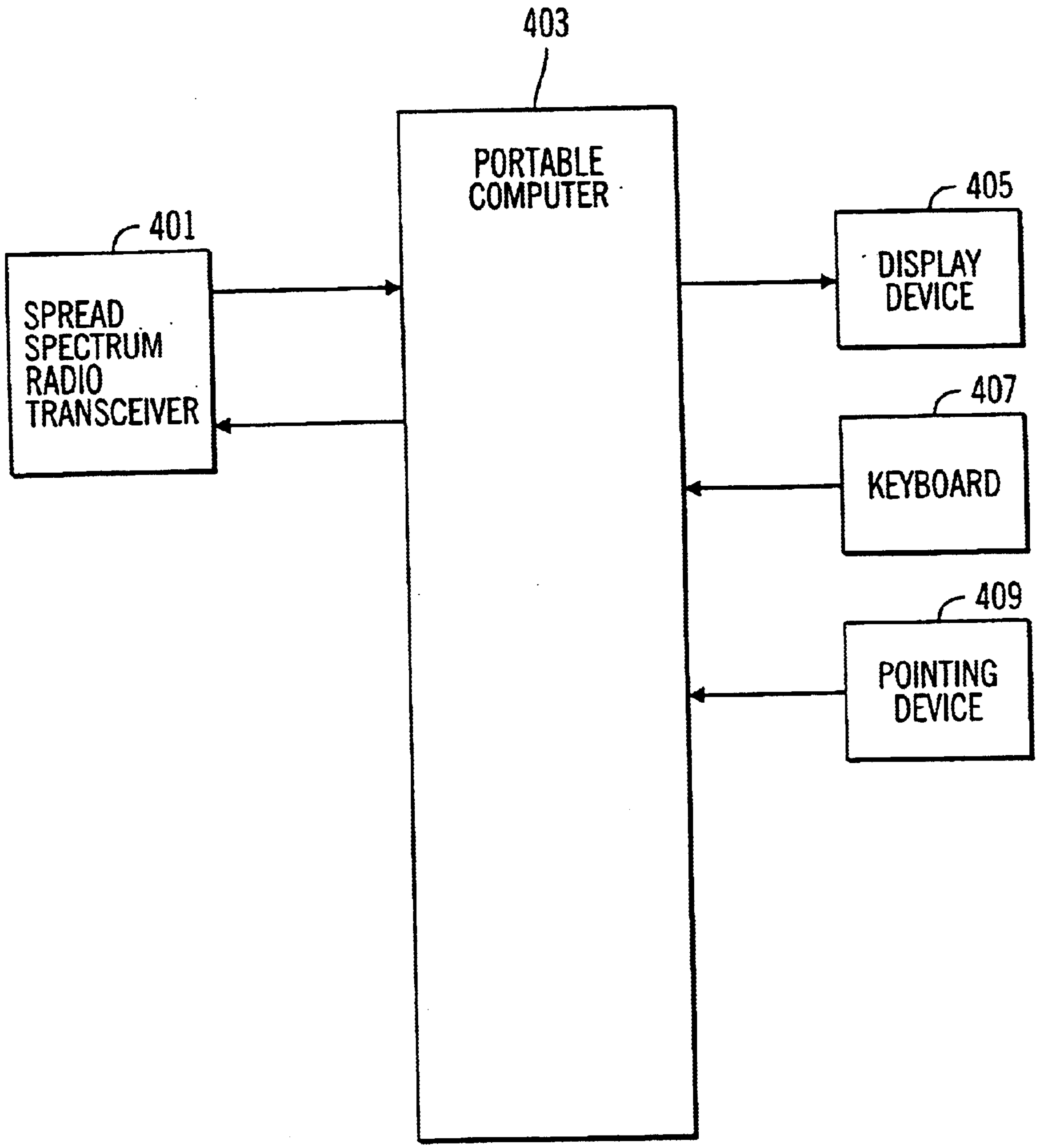

FIG. 4*a* is a block diagram of an enforcement system according to an embodiment of the invention.

Figure 4B:
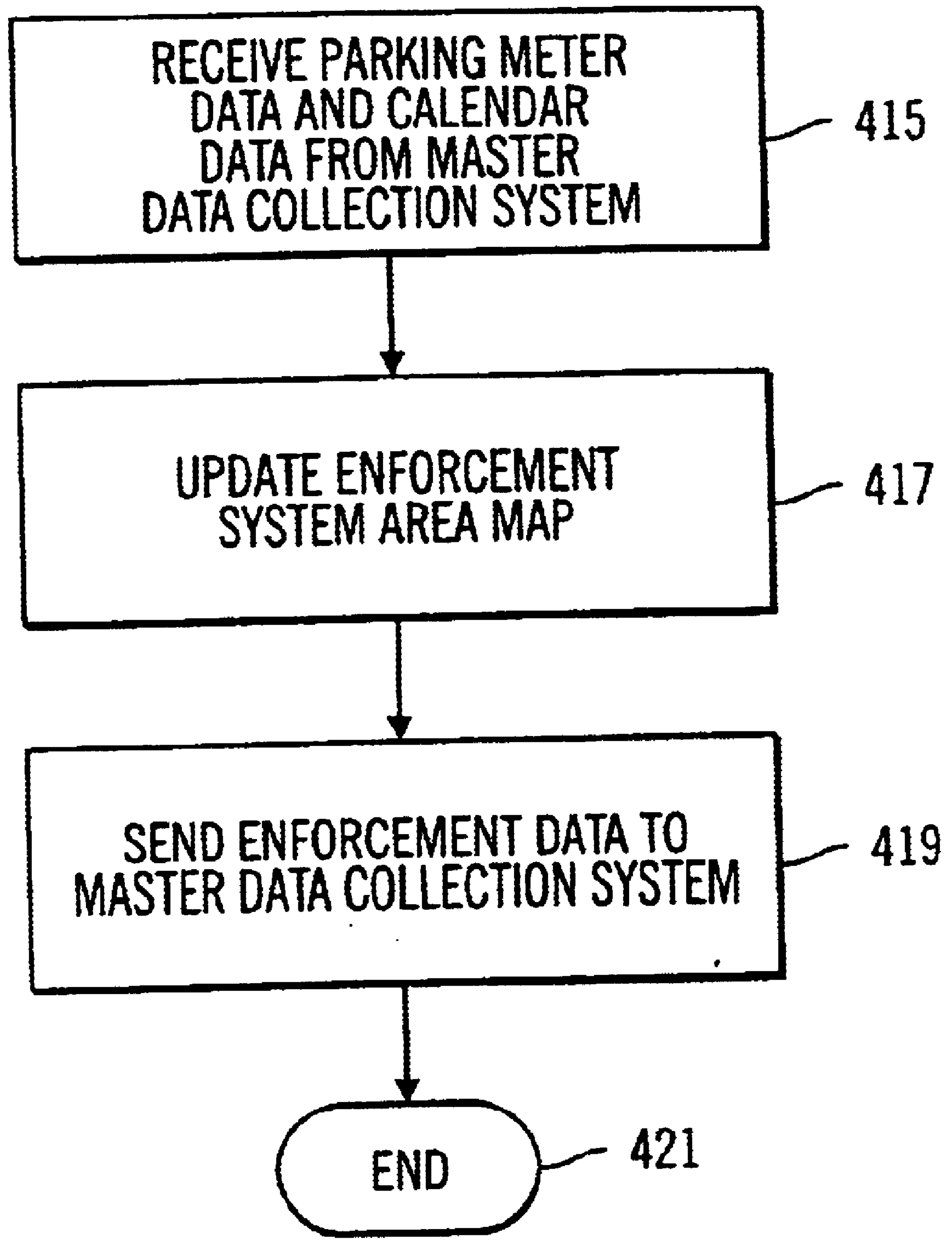

FIG. 4*b* is a flow diagram of the functioning of an embodiment the enforcement system according to an embodiment of the invention.

Figure 5:
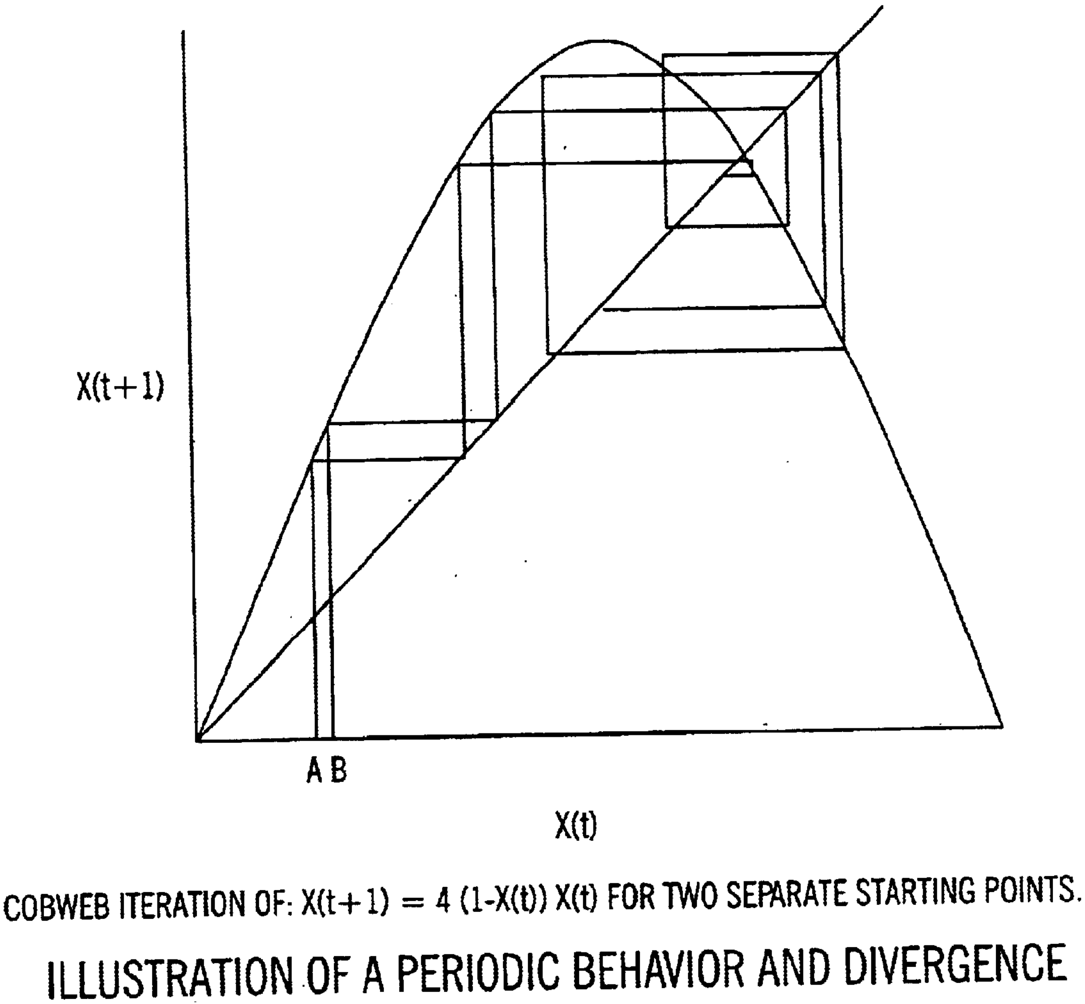

FIG. 5 is a graphical illustration of a periodic behavior and divergence.

DETAILED DESCRIPTION OF THE DISCLOSURE

Accompanying drawings refer to and illustrate descriptions of exemplary embodiments of the present invention. It is to be understood that other embodiments may be practiced as implementation dependant and structural changes may be utilized without departing from the scope and spirit of the invention disclosed herein.

According to one aspect of the invention an embodiment of the present invention provides a system for the management of parking enforcement.

FIG. 1*a* is a block diagram illustrating a system overview according to an embodiment of the invention.

The system comprises several parking meters and their interfaces 101. The parking meters and interfaces 101 transmit state data upon a state change within the parking meter system 101 to a message filtering and concentrator 103. Although many different types of communication may be used to transfer data from parking meter systems 101 to message filtering and concentration units 103, in an embodiment, the communication from the parking meter systems 101 is a unidirectional broadcast interface to the message filtering and concentrating unit 103. In an embodiment, the communication between the parking meter interface 101 and the filtering and concentrator unit 103 is accomplished by a spread spectrum broadcast from the parking meter systems 101 to the message filtering and concentrator agent 103. In an embodiment, the actual communication comprises packetized redundant data. That is, upon a state change, a parking meter system 101 will send a series of data packets, at intervals to be determined by a scheduling mechanism within the parking meter interface 101, to the message filtering concentrator unit 103. There may be a number of parking meter interfaces 105, coupled in like manner to message filtering and concentrator units 107. The message filtering and concentrator system, for example 103 and 107, are coupled bi-directionally to a master data collection system 109. The couplings between the message filtering and concentration units, for example

103 and 107, to the master data collection unit 109, may be a variety of different couplings known in the art. For example, the master data collection system 109 may simply poll each message filtering and concentrating unit 103 and 107. In addition, broadcasts from the message filtering and concentration units 103 and 107 may be scheduled so as to take place according to a master system clock within the master data collection system 109. The communication between the message filtering and concentrator units and the master data collection unit may also be of other types, such as an ethernet connection, or any other suitable coupling known in the art. In an embodiment, the coupling is via a bi-directional spread spectrum radio link between the master data collecting system and the message filtering and concentration agents. In contrast, in an embodiment, the coupling between the parking meter systems and the message filtering and concentration system is a unidirectional interface from the parking meter system to the concentrator unit, as shown by arrows 117. The master data collection system 109 communicates with enforcement units 111. In an embodiment, the communication between the master data collection system 109 and the enforcement units 111 is via a spread spectrum radio link 115. Each enforcement unit may have its own separate spread spectrum code, and hence all enforcement units 111 can receive simultaneous transmissions from the master data collection system 109.

FIG. 1*b* is the block diagram of a parking meter interface according to an embodiment of the invention.

The parking meter interface system in an embodiment is constructed using a microprocessor having at least 13 input/output pins, a crystal-controlled oscillator for providing clocking functions to the microprocessor (not shown), and a reset pin. The microprocessor 129 of the example embodiment also communicates with a watchdog timer 121. The watchdog timer 121 is a periodic timing signal that will reset the microprocessor unless the microprocessor 129 has periodically sent a clear signal to the watchdog timer. The watchdog timer is used to reset the microprocessor in the case that the microprocessor program has crashed or entered an infinite loop or unknown state and therefore cannot execute the current program without being reset. Watchdog timers and their functions are well known in the art. A low-powered detection circuit 123 also communicates with the microprocessor 129. This information, when coupled from the low-power detection circuit 123 to the microprocessor 129, can then be communicated as status information to a supervisory data collection system, such as the master data collection system 109.

A tamper detection circuit 125 may also be interfaced with the microprocessor 129. The tamper detection circuit may be an interlock circuit that detects when the case of the parking meter system is opened. It may also be a vibration detector, such as a mercury switch, or any common tamper detection mechanism known in the art. A detection of tampering 125 will be passed on to the microprocessor 129, which then will report the detection of tampering as part of its status.

A meter state detector 127 may be used to detect the state of a meter. The meter may be actively metering time, timed out or in a violation state, which are common in conventional meters. The meter state detection circuitry, which may be any suitable system, such as a Hall effect detector, can detect the state of the meter and pass it on to the microprocessor 129. The microprocessor can then incorporate the meter state detection within its status.

A vehicle detector may also be interfaced to the microprocessor. The vehicle detection system may comprise any suitable input, such as a pressure sensing device, which may detect a vehicle, a treadle, which may detect a vehicle running over the treadle, or as in the present illustrative embodiment, an ultrasonic detection unit. The ultrasonic detection unit comprises an ultrasonic speaker 131, which may be periodically activated by the microprocessor 129. A vehicle present in the parking space will reflect the ultrasonic sounds produced by the ultrasonic speaker into an ultrasonic microphone 133, which will then be further coupled into the microprocessor 129. The detection of a vehicle will also be incorporated into the state of the parking meter system. The ultrasonic microphone may be turned on shortly after the ultrasonic speaker is activated, thereby saving system power.

The microprocessor can transmit its status via radio transmitter 135. A transmission will be generally initiated by a change of state of the parking meter system as detected by the microprocessor 129. Upon detection of a change of state in the parking meter system, the microprocessor can activate the radio transmitter 135 and send a series of packets of data to a message filtering and concentrator, such as 103 illustrated in FIG. 1*a*.

A watchdog reset timer that will restart the microprocessor if it fails to send a clear signal in time.

An Embodiment of the Parking Meter Unit

In one embodiment the parking meter unit is constructed using a microprocessor having at least 13 input/output pins, a crystal controlled oscillator, and a reset pin. The input/output pins are assigned to various functions as follows: one to control power to the ultrasonic microphone, one to receive signals from the ultrasonic microphone, one to drive the ultrasonic speaker, one to detect meter status (violation, timeout, metering time), one to power the meter status detector, one to drive the ultrasonic tamper speaker, one to send data to the RF transmitter, one to clear the external watchdog timer, one to detect the low power condition, one to blink an indicator led when power is not low and when packets are being transmitted, one for serial data input, and one for serial data output. An example of such a microprocessor is Micro Chip's PIC16C622. The microprocessor wakes up approximately every 20 seconds, checks its sensors and then goes back to sleep. This results in extremely low power consumption.

An external watchdog timer is used in the present embodiment. The external watchdog time should have a timeout period of approximately one second. It should be capable of being reset by a single control line. An example of such a device is Dallas Semiconductor's DS1706.

The low power detect circuit used in the present embodiment comprises a capacitor and resistor connected to a single input/output pin on the microprocessor. The microprocessor grounds the pin then tri-states it and measures the time charge the capacitor.

The ultrasonic speaker circuit used in the presently described embodiment the parking meter unit comprises two resistors and an inductive kickback suppressing diode connected to a microprocessor output pin. Code within the microprocessor determines the duration, frequency, and pattern of the generated sound pulse. The ultrasonic microphone power circuit consists of a resistor and power-switching transistor (MMBT2222AL) connected to a microprocessor output pin. The ultrasonic microphone signal detector circuit consists of a two-transistor amplifier that feeds the signal into a comparator that is connected to a microprocessor input pin. Code within the microprocessor detects ultrasonic echoes from the signal received on this pin.

A Hall effect detector is used to check for meter status. The output of this detector is fed into a microprocessor input pin. The Hall effect detector is powered by a resistor and power-switching transistor (MMBT2222AL) connected to a microprocessor output pin.

A Part 15 RF transmitter that operates at 433.92 MHz and comprises one transistor, two inductors, a resonator, three resistors, and six capacitors is used in the present embodiment. The data is sent using CW techniques at 5,000 bits per second. Each data packet is prefaced by a unique synchronizing pattern that never matches any valid data sequence.

FIG. 1*c* is a flow chart of the overall parking meter interface operation according to an embodiment of the invention.

The microprocessor within the current illustrative embodiment awakens as in block 151. Many current microprocessors have sleep modes in which they may be awakened periodically to service processing needs. Alternately, separate circuits can be provided to awaken, i.e., turn on, microprocessors at given time intervals. Once the microprocessor has awakened it can read all sensors in block 143. The microprocessor then compares the sensor readings to the previous sensor readings, and if all sensors are in the previous state block 155 directs the execution to block 157 and the program execution ends and the microprocessor can return to the sleep mode. If all sensors are not the same as the previous state, a new state is defined in block 159. The new state information is then transmitted to a meter filtering and concentrator such 103, illustrated in FIG. 1*a*. When the state information has been transmitted, the process ends in block 163.

FIG. 1*d* is a graphical illustration of the creation and transmission of packets by parking meters, in an embodiment of the parking meter system.

The microprocessor detects a state change as depicted in block 171. The microprocessor will then transmit a number of redundant data packets to a meter filtering and concentration unit such as 103 or 107 as illustrated in FIG. 1*a*. The number of redundant data packets sent will depend on a number of implementation factors, such as the number of meters transmitting data, the update time for each meter, and the amount of interference with the transmissions present in the system area. In the present illustrative embodiment, 16 data packets are transmitted. Therefore, in the case of FIG. 1*d*, wherein redundant data packets 175 are transmitted n will equal to 16. Each data packet contains several bits of information. The first bit of information is a replicate number 177. The replicate number 177 is merely a number of replicate data packets of the current parking meter system status which have already been sent. For example, if the replicate number 177 is 0, there have been no redundant data packets transmitted previously. If the replicate number 177 is 1, then 1 previous redundant data packet has been transmitted. If the replicate number is 2, then 2 previous redundant data packet s have been transmitted, etc. Another piece of information contained within the data packets is the state change number illustrated in FIG. 1*d* as 179. The state change number is a sequential number, which is updated as state changes are transmitted. The state change number 179 within the data packets 175 may be reset to 0 at the beginning of each day, each week, or other suitable period. The state change number simply identifies a unique state change data packet. Also within the data packet 175 is an identification number 181. The identification number 181 identifies the parking meter unit which is transmitting the data packet. Finally, the data packet 175 will contain the actual state information 173 of the parking meter system.

In the present illustrative embodiment, all data packets are sent overtime period time period between 10 and 20 seconds. This is accomplished by first establishing a minimum time period T 185 between the transmission of each redundant packet. The maximum time of transmission between two packets is 2*T. Therefore, the time to transmit all data packets can vary between and 10 and 20 seconds. It is desirable that the redundant data packets not be transmitted at regular intervals due to several considerations. The first consideration is FCC part 15 requirements. The FCC frowns on the transmission of regular interval signals because it may cause a periodic influence with other signals.

Also, if each data packet were transmitted the same amount of time apart, if another transmission from another parking meter were to coincide with the first transmission, then all packets might coincide. When packets coincide, interference can happen and the state information of both transmitting units can be interfered with. If, however, redundant data packets are transmitted at odd intervals with respect to each other, there is little chance of all data packets being interfered with and, therefore, some data packets will be received. By spacing the transmission of data packets at non-regular intervals, the probability that at least one packet will not be interfered with, by another transmitting unit, is greatly increased. Each packet is transmitted at an interval equal to T 185, the minimum interval between packets, plus a $\Delta T$, which varies from packet to packet. The $\Delta T$ between each packet is generated by a chaotic timing generator 185. A chaotic timing generator receives the identification number of the particular metering system as a seed for the timing generator. The timing generator then employs a chaotic map 187, which is a nonlinear sequence of numbers varying between 0 and T. For example, the transmission time between the #0 packet 189 and the #1 packet 191 will differ be by T 185, which is the minimum transmit time between packets and a $\Delta T_1$ 187, which has been generated by the chaotic timing generator. As the chaotic timing generator 185 generates each $\Delta T$, it is fed back to the timing generator to generate the next $\Delta T$ interval. The chaotic timing generator may contain any suitable nonlinear function. The output of the timing generator is scaled so that the value is between 0 and T, as required by the system specification chosen for the present embodiment. Those skilled in the art will recognize that the timing considerations can be adjusted due to any number of factors such as the number of redundant data packets transmitted, the minimum time between packets, the maximum time between packets can all be adjusted depending on the needs of a particular implementation.

The chaotic timing generator 185 also can be adjusted. The chaotic timing generator 185 may also comprise a timing generator that generates a stream of successive chaotic numbers comprising more bits than is required in order to generate the $\Delta t$ values, in such a case, a subset of bits can be chosen from the numbers generated by the chaotic timing generator 185. The present embodiment employs a chaotic map which utilizes the equation $x(t+1)=4(1-x(t))x(t)$. This particular chaotic map is illustrated in FIG. 5. Any other suitable nonlinear equation can be used within the chaotic timing generator. In the present embodiment, the $x(t)$ at time $t=0$ is equal to the identification number 181 of the particular parking meter system sending the data packets. In the chaotic map 187 the equation used is $x(t+1)=4(1-x(t))x(t)$. By using such a timing generator, the time between packets will be randomly distributed between t, the minimum time between packets, and 2t, the maximum time between packets.

FIG. 2*a* is block diagram of a message filtering and concentrator unit according to an embodiment of the invention.

The embodiment of the message filtering and concentrator illustrated in FIG. 2 comprises two microprocessors 205 and 209. The message filtering concentrator comprises a radio receiver 201. The radio receiver 201 is preferably a low-power radio receiver that collects data sent by the radio transmitter such as 135 illustrated in FIG. 1*b*.

Watchdog timer 203 is a common watchdog circuit, which will reset the program of the microprocessor 205 if it does not receive a reset pulse during the proper time interval. Microprocessor 205 is tasked to collect, filter and forward packets from the parking meter interface units, such as that illustrated in FIG. 1*b*. Microprocessor #1 205 communicates with microprocessor #2 using a set of communication lines 207. The second microprocessor 209 is tasked to forward data packets from microprocessor #1 to the master data collection system when queried. The second microprocessor 209 is also coupled to a spread spectrum radio transceiving unit 211. The radio transceiving unit 211 will maintain the data link to the master data collection system such as 109 illustrated in FIG. 1*a*. The second microprocessor, unit 209, also has a watchdog timer 213. The watchdog timer 213 is used for the purpose of resetting the microprocessor 209 if its program should crash or fail to run properly, and thereby fail to reset the watchdog timer in a timely fashion.

An Embodiment of the Master Data Collection System

The master data collection system can be any processor having the capabilities of a 166 MHz Pentium machine. The mass storage device should have a capacity of at least 1 to 2 billion bytes (or more depending on desired data collection and retention requirements). A video display with resolution of 800 by 600 (minimum), a keyboard, and a pointing device (such as a mouse) may be included. The spread spectrum transceivers are attached to a serial (RS232) port. An external watchdog timer is attached to the system to restart it in the event of a momentary machine failure. In this way unattended operation of the system is facilitated.

FIG. 2*b* is a flow chart of process of message filtering and concentration according to an embodiment of the invention.

The message filtering and concentrator receives a data packet from the parking meter radio in step 221. In step 223, the data packet is examined to determine if it is a duplicate of a previous data packet. If the data packet is a duplicate of the previous data packet, it is discarded and the sequence ends in block 225. If the packet is not a duplicate of a previous packet, the packet is stored in memory in step 227. Next, if there is a request from an enforcement unit, then the data packet is sent in step 231 and the process ends in 233. If, in step 229, there is not a request from an enforcement unit for the packet and it is not a normal time to transmit such a packet without a request, then the system idles and waits until there is a request for the packet or the normal time for transmitting such packet occurs.

FIG. 3*a* is a block diagram a master data collection system according to an embodiment of the invention.

The master data collection system illustrated in FIG. 3*a* incorporates a master computer 305. The master computer 305 is also coupled to a watchdog timer 303, so that if master computer should fail to issue a clear pulse to the watchdog timer in a timely fashion, the watchdog timer will assume that the master computer has crashed or is functioning improperly and issue a reset command to the master computer 305, thereby restarting the program within the master computer. The master computer 305 is also interfaced with a spread spectrum radio transceiver 301. The spread spectrum radio transceiver maintains a data link to the message filtering and concentrator system, and also the enforcement systems. The master computer system may be any suitable computer system, such as a 166-megahertz Pentium personal computer system. The master computer system may run unattended, according to a program within the computer, or may have a user interface to facilitate interaction with the system.

In an embodiment, the master computer system 305 interfaces with a data base 307. The data base 307 is a non-volatile data storage device which contains a data base that describes the location, state and calendar for all of the parking meters within the system. The master computer 305 may also be interfaced to a display device 309, a keyboard 311, and a pointing device 313, such as a touchpad or a mouse in order to facilitate interaction with the system.

An Embodiment of the Message Filtering and Concentrator Agent

An embodiment of the Message Filtering and Concentrator Agent is implemented using two microprocessors that are linked by an eight-bit data path controlled by two handshake lines. The first microprocessor is connected to the RF receiver implemented using an RFM RX1000 radio receiver (operating at 433.92 MHz), four capacitors, a CD4050 signal buffer. Serial RF data is converted to parallel, duplicates are discarded, and a single data packet is forwarded to the second microprocessor. The second microprocessor is connected to the spread spectrum transceiver radios through an RS232 voltage conversion IC (MC145407). Both microprocessors have independent Dallas Semiconductor DS1706 external watchdog timers attached. The spread spectrum transceivers should be capable of operating over a distance of two miles. Radios with this capability can be acquired from APEX Radios, Inc.

FIG. 3*b* is a flow diagram of the functioning of an embodiment the master data collection system according to an embodiment of the invention.

In step 321, the data collected from parking meters is stored in a suitable storage within the master data collection system. The data is then sorted by enforcement system in step 323. Next, the system examines if there is a calendar event for the enforcement system in step 325. If there is a calendar event for the enforcement system that has not been sent to the enforcement system, the calendar information is sent to the data enforcement system in 327. If there is not a calendar event for the enforcement system 325, then the parking meter data is sent to the enforcement system in step 329. After the parking meter data is sent to the enforcement system and the calendar information has been set if there was a calendar event, the process ends in step 331.

FIG. 4*a* is a block diagram of an enforcement system according to an embodiment of the invention.

The enforcement system comprises a portable computer 403 because the system is designed to be mobile. The portable computer is interfaced to a spread spectrum radio transceiver 401 that maintains a data link to the master data collection system.

The portable computer 403 is also interfaced to a display device 405, a keyboard 407, and a pointing device 409. An enforcement system may serve several functions. For example, an enforcement system may direct a mobile enforcement unit to vehicles, which are in violation of the parking ordinances. The enforcement system may also direct a mobile unit to an area where there are a large number of vehicles parked illegally or parked during a time period which allows parking but is soon to change to a time period which does not allow parking. The portable computer can be used to direct the enforcement unit to an area where the largest number of violations are present. By directing the enforcement unit to an area which the largest number of violations are present, the efficiency of the enforcement system can be maximized. After reaching an area with a large number of violations, the enforcement unit may record that those violations have all been ticketed. This information can be then passed to the master data collection system, and then the enforcement unit can be directed to a nearby area where there are a large number of violations present. In the way, the enforcement unit can be directed to areas where it can maximize its efficiency and minimize its travel time. Enforcement units may be utilized within parking enforcement units which issue tickets to illegally parked vehicles, or the enforcement system may be utilized within municipal tow trucks, which can be directed to vehicles which are parked in violation of towing regulations. Sophisticated algorithms can also be run within the enforcement systems. For example, given a large number of potential targets, the enforcement system may illustrate to the enforcement unit which violations comprise the most expensive violations, thereby maximizing the revenue-producing aspect of the enforcement unit.

An Embodiment of the Enforcement System

The enforcement system can be any portable computer having the capabilities of a 166 MHz Pentium machine. A display (640 by 480 minimum), keyboard, and pointing device may be included. No watchdog device is required as this system is always attended.

FIG. 4*b* is a flow diagram of the functioning of an embodiment of the enforcement system. FIG. 5 is a graphical illustration of a periodic behavior and divergence of generated chaotic sequences.

The enforcement system receives parking meter data and calendar data from the master data collection system in step 415. Then, in step 417, the enforcement system area map, which represents a map of the enforcement area, is updated. Using this map the enforcement unit can then be directed to areas in which it is needed. When an enforcement unit services a particular area, either by ticketing vehicles or towing vehicles or performing any other enforcement service, the enforcement data is sent to the master data collection system in step 419. The process then ends in step 421. In this way the enforcement system receives current data about enforcement matters in its enforcement area and the enforcement system also updates the data into the master data collection system. The master data collection system will then have the most up-to-date data in order for statistical processing and for identifying enforcement needs.

Chaotic Map for Timing Interval Generation

Solutions to nonlinear finite-difference equations may have three forms: 1) Steady state—the solution approaches a certain state an remain fixed at the steady state value, 2) Periodic cycles—the solution has cycles that repeat periodically, and 3) and a-periodic behavior—the solution oscillates but not in a periodic way. The equation that produces a-periodic behavior to produce a chaotic map has properties that distribute the RF data packets from the parking meter interface unit over a time interval so that the probability of packets interfering with each other is minimized. To illustrate this see FIG. 5 which shows how two different starting points follow rapidly diverging paths for the chaotic map: $x(t+1)=4(1-x(t))x(t)$. For the purposes of this invention we use the unique 32-bit identification number of each parking meter interface as the starting $x(t)$ value. Since computers compute using whole numbers (integers) it is possible that two different starting points will arrive at the same $x(t+n)$ value at some future time n. To reduce the probability of this happening, one may increase the number of bits being used in the computation. In case of an embodiment a 32 bit starting number is used but the number computes products that result in 64 bits. This improves the probability of a random distributions greatly. Further improvement is made by injecting a random noise bit so that the set of numbers approximates a real number. It can readily be seen that if two units happen to arrive at the same $x(t+n)$ value, this random perturbation will cause them to separate and the chaotic map will then drive them apart in an exponential manner.

In an embodiment of the invention the packets are distributed over a 20-second time interval (approximately). All packets are sent out between 10 and 20 seconds. To accomplish this distribution a delta value $d=10/16$ is computed. Five bits are then taken from the x value (x5) computed by iterating the chaotic map one time and use them to compute an offset value $o=10/(x5+16)$. The sum $(d+o)$ becomes the time interval between succeeding packets.

Further examples of non-linear functions which may be utilized to generate transmission maps may be found in the book Understanding Nonlinear Dynamics by Kaplan, Daniel and Leon Glass, Springer-Verlag, New York 1995, where page 11 further illustrates a function as shown in FIG. 5.

The foregoing description of embodiments of the present invention are described for the purpose of illustration and description of aspects of the invention. It is not intended to limit the invention to the implementations described. The embodiments described are not exhaustive in providing a description of the form and substance of the invention and variations, modifications, and implementations are possible in light of the preceding teachings.

What is claimed is:

1. An electronic parking meter system for use with parking enforcement personnel and a plurality of parking meters, the system comprising:

parking meter units, each associated with a respective parking meter;

at least one data unit for collecting data from the parking meter units;

a first communication link for transmitting data between the parking meter units and the data unit, the first communication link being unidirectional;

at least one parking enforcement unit associated with the parking enforcement personnel; and a second communication link for transmitting data between the data unit and the parking enforcement unit.

2. The system of claim 1, wherein the first communication link further comprises: a transmitter coupled to the parking meter units for transmitting data from the parking meter units to the data unit; and a receiver coupled to the data unit for receiving data from the parking meter units into the data unit.

3. The system of claim 1, wherein the first communication link is a spread spectrum broadcast.

4. The system of claim 1, wherein the data transmitted by the first communication link is packetized redundant data.

5. The system of claim 4, wherein the packetized redundant data comprises: a replicate number; a state change number; an identification number; and state information.

6. The system of claim 4, wherein a transmit time for the packetized redundant data includes a variable time generated by a chaotic timing generator.

7. The system of claim 1, wherein the data unit comprises: at least one concentration unit for receiving data from multiple parking meter units; and a collection unit for gathering data from the at least one concentration unit.

8. The system of claim 7, wherein the at least one concentration unit filters out redundant data.

9. The system of claim 7, wherein the collection unit polls the at least one concentration unit.

10. The system of claim 7, wherein the collection unit receives data periodically from the at least one concentration unit.

11. The system of claim 7, wherein the concentrator unit comprises: a least one microprocessor for filtering data and forwarding data to the collection unit; a radio receiver for receiving data interfaced to the at least one microprocessor; and at least one watchdog timer interfaced to the at least one microprocessor for resetting the at least one microprocessor.

12. The system of claim 7, wherein the collection unit comprises: a master computer for processing data; a watchdog timer coupled to the master computer for resetting the master computer; a spread spectrum radio transceiver interfaced to the master computer for communicating with the concentrator unit and the parking enforcement unit; and a storage unit interfaced to the master computer for storing data.

13. The system of claim 1, wherein the collection unit couples to the at least one concentration unit via a bi-directional spread spectrum radio link.

14. The system of claim 1, wherein the second communication link for transmitting data between the data unit and the parking enforcement unit is a spread spectrum radio link.

15. The system of claim 1, wherein the parking meter units comprise sensors for providing information about a state of the parking meter.

16. The system of claim 15, wherein the parking meter units further comprises: a microprocessor for checking a state of the sensors and transmitting new states to the at least one concentration unit; and a watchdog timer for resetting the microprocessor if the microprocessor does not periodically signal the watchdog timer, the watchdog timer being interfaced to the microprocessor.

17. The system of claim 16, further comprising: a vehicle detector for detecting the presence of a vehicle at a parking meter, the vehicle detector being interfaced to the microprocessor; a tamper detection circuit for detecting tampering with a parking meter, the tamper detection circuit being interfaced to the microprocessor; a meter state detector for detecting a state of a parking meter, the meter state detector being interfaced to the microprocessor; and a low power detection circuit for detecting when power has reached a threshold, the low power detection circuit being interfaced to the microprocessor.

18. The system of claim 17, wherein the vehicle detector comprises: an ultrasonic speaker for transmitting an ultrasonic wave; and an ultrasonic microphone for receiving reflections of the ultrasonic wave from a vehicle.

19. The system of claim 1, wherein the enforcement unit further comprises: a portable computer for processing data; and a spread spectrum radio transceiver for receiving and transmitting data interfaced to the portable computer.

20. A system as recited in claim 1, wherein each parking meter unit includes a transmitter and is free of a receiver, for providing unidirectional transmissions of data to at least one data unit.

21. A method for enforcing parking ordinances comprising:

providing a unidirectional communication link between at least one parking meter and a data unit;

transmitting data from the at least one parking meter on the unidirectional communication link;

receiving the data at a data unit;

transmitting the data from the data unit to a parking enforcement unit;

determining parking ordinance violations based on the data; and issuing a citation to vehicles in violation of the parking ordinance.

22. The method of claim 21, further comprising: awakening a microprocessor; directing a microprocessor to read sensors; comparing sensor readings to previous sensor readings; returning the microprocessor to a sleep mode if the sensor readings are unchanged; and transmitting the sensor readings to the data unit if the sensor readings are changed.

23. The method of claim 22, further comprising: determining if the data received at the data unit is a duplicate of previous data; discarding the data if the data is a duplicate of previous data; storing the data in memory if the data is not a duplicate of previous data; determining if a request from the parking enforcement unit has been made; and transmitting the data to the parking enforcement unit if a request has been made.

24. The method of claim 23, further comprising: determining if a calendar event for the parking enforcement unit exists; and transmitting the calendar event to the parking enforcement unit if it exists.

25. The method of claim 24, further comprising: updating an enforcement system area map; and directing the parking enforcement unit to an area on the map.

26. The method of claim 21, wherein transmitting data further comprises transmitting data via a spread spectrum broadcast.

27. The method of claim 21, wherein transmitting data further comprises transmitting packetized redundant data.

28. The method of claim 27, further comprising generating a transmit time for the packetized redundant using a chaotic timing generator.

29. A method as recited in claim 21, wherein the at least one parking meter comprises a plurality of parking meters, each provided with a respective unidirectional communication link to the data unit.

30. A method as recited in claim 21, wherein transmitting data on the unidirectional communication link comprises configuring each parking meter unit to include a transmitter and be free of a receiver, for providing unidirectional transmissions of data to the data unit.

* * * * *